J. R. CHRISTOPHER.
MACHINE FOR REMOVING BOLL WEEVIL.
APPLICATION FILED AUG. 19, 1914.

1,156,208. Patented Oct. 12, 1915.
2 SHEETS—SHEET 1.

Witnesses. J. R. Christopher Inventor by C. A. Snow & Co.
Attorneys

J. R. CHRISTOPHER.
MACHINE FOR REMOVING BOLL WEEVIL.
APPLICATION FILED AUG. 19, 1914.
1,156,208.
Patented Oct. 12, 1915.
2 SHEETS—SHEET 2.
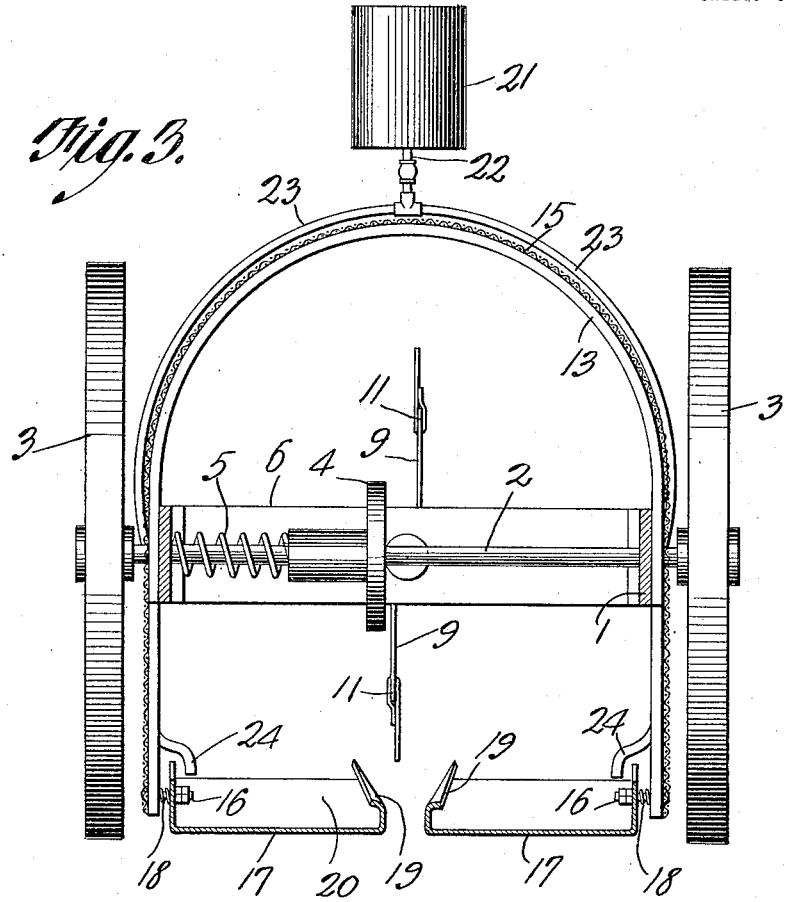
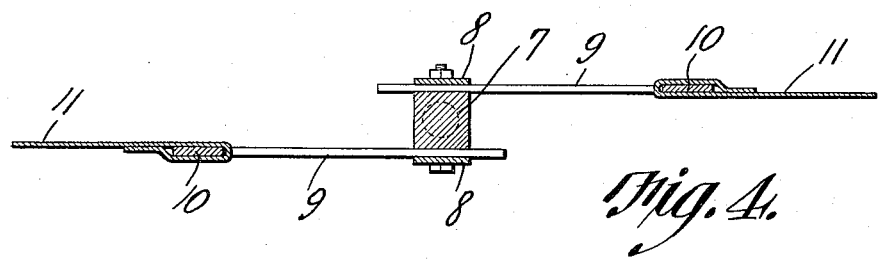
Witnesses
J. R. Christopher, Inventor
by C. A. Snow & Co., Attorneys

UNITED STATES PATENT OFFICE.

JOHN ROBERT CHRISTOPHER, OF MABEN, MISSISSIPPI.

MACHINE FOR REMOVING BOLL-WEEVIL.

1,156,208.

Specification of Letters Patent.  Patented Oct. 12, 1915.

Application filed August 19, 1914.   Serial No. 857,535.

*To all whom it may concern:*

Be it known that I, JOHN R. CHRISTOPHER, a citizen of the United States, residing at Maben, in the county of Oktibbeha and State of Mississippi, have invented a new and useful Machine for Removing Boll-Weevils, of which the following is a specification.

This invention relates to machines for removing boll weevils from cotton plants, one of its objects being to straddle a row of plants and, as it passes thereover, to so agitate the plants as to cause the insects to fall therefrom into trays designed to receive them, these trays containing an oil designed to destroy the insects.

A further object is to provide plant agitating devices which will not injure the plants and which can be actuated at any desired speeds.

A further object is to provide receiving pans which travel close to the ground and are free to shift upwardly to adapt themselves to any unevenness or irregularity in the surface of the soil.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
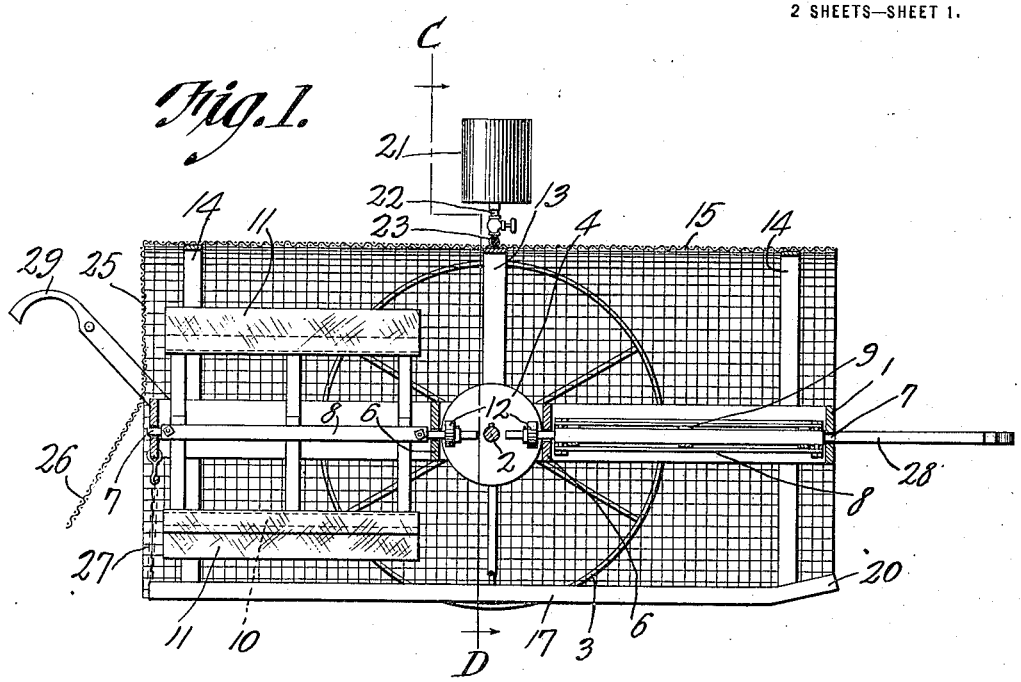
Figure 2:
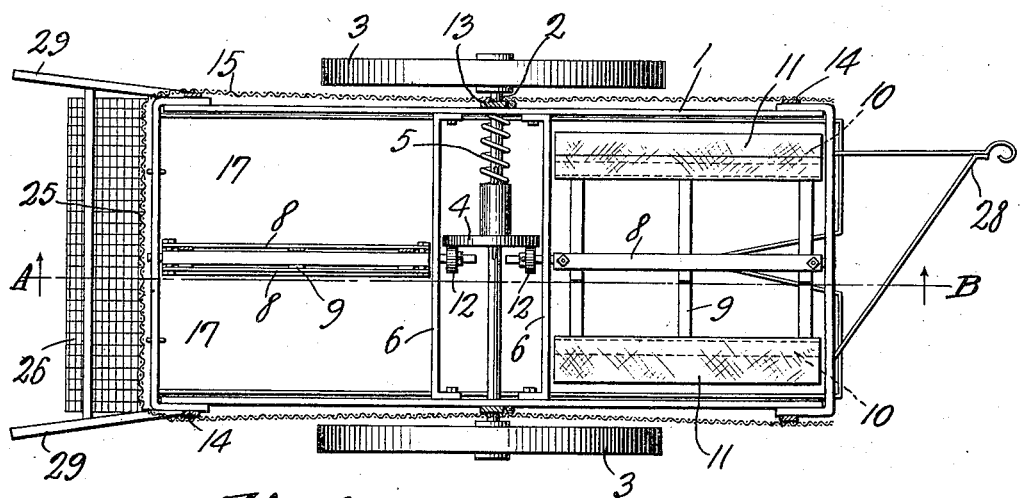

In said drawings:—Figure 1 is a vertical longitudinal section through the machine, said section being taken on the line A—B Fig. 2. Fig. 2 is a plan view, the foraminous housing and its frame being in section. Fig. 3 is an enlarged section on line C—D Fig. 1. Fig. 4 is an enlarged section through one pair of beaters and the shaft thereof.

Referring to the figures by characters of reference 1 designates a substantially rectangular frame and a drive axle 2 extends transversely through the frame at the center thereof and is supported by wheels 3 designed to rotate the axle. One of these wheels can be loosely mounted while the other can be fastened to the axle. A friction disk 4 is feathered on the axle 2 and a spring 5 bears against the disk and serves to hold it normally pressed inwardly toward the center of the frame.

Cross strips 6 are secured within the frame at opposite sides of and parallel with the shaft 2 and journaled within these strips and within the end portions of the frame 1 are alining longitudinal shafts 7. Each of these longitudinal shafts is rectangular in cross section for the greater portion of its length, and as shown in Fig. 4, and secured upon opposite faces of each of the shafts 7 are clamping strips 8. These clamping strips are adapted to bind arms 9 onto the shaft and the said arms are connected, at their outer ends, by longitudinal strips 10 about which are wrapped and secured flexible beaters 11 formed of any suitable fabric. Obviously by loosening the strips 8 the arms 9 can be adjusted longitudinally so that the beaters will thus be held at any desired distance from the shafts 7.

Secured upon the inner end of each of the shafts 7 is a friction disk 12, this disk being constantly engaged by the friction disk 4, spring 5 serving to hold the disks in contact. Disks 12 are adjustable longitudinally along the shafts 7 so as thus to be caused to engage the drive disk 4 at any desired distance from the center thereof. Consequently shaft 7 can be driven at any speed desired.

Mounted on the frame 1 at the center of the sides thereof is a bowed supporting strip 13 and additional bowed supporting strips 14 are secured to the sides of the frame adjacent the ends thereof, these last mentioned strips extending downwardly to points close to the ground. A foraminous housing 15 is mounted on and secured to the strips 13 and 14 and extends close to the ground. This housing is preferably made up of a heavy wire fabric as shown.

Extending inwardly from the lower end portions of the strips 14 are studs 16 extending through the outer sides of pans 17, there being springs 18 mounted on these studs and between the pans and the strips 14 so as to push inwardly against the pans. The inner side of each pan is inturned, as shown at 19 and the front end of each pan is upwardly inclined as shown at 20. A receptacle 21 for oil or other suitable fluid is supported above the strip 13 by a pipe 22 which discharges into arcuate pipes 23 extending downwardly along the strips 13 and discharging into the pans 17, as shown at 24.

The rear end of the housing 15 is partly closed by a foraminous end wall 25 the lower end portion of which hangs freely as shown at 26, thus to form an apron designed to drag over the plants along which the machine is traveling. The rear ends of the pans 17 are connected to the rear end of the frame 1 by chains 27 or other flexible devices so that said pans are thus prevented from sagging into contact with the ground although capable of riding along the ground and of swinging upwardly when passing over an uneven surface.

Any suitable draft appliance such as indicated generally at 28 may be connected to the front end of the frame 1, it being understood that the machine is preferably designed to be drawn forward by one or more horses although any other means may be used for propelling it. During the movement of the machine along a row straddled thereby, motion will be transmitted from the disk 4 to the disk 12 and the beaters 11 will be caused to rotate with the shafts 7, thus striking the plants and causing the boll weevils to fall therefrom into the pans 17 which are located at opposite sides of the row. Oil or other fluid which will kill the insects is delivered into the pans 17 by way of the pipes 22 and 23 and, as the inner walls of the pans are provided with inwardly extended flanges 19, and as the outer walls of the pans are higher than the inner walls, it will be seen that there is no danger of any of the fluid pouring out of the pan when said pan is tilted laterally while passing over an uneven surface.

As shown in the drawings, handles 29 may be extended rearwardly from the frame 1 to enable the user of the machine to properly manipulate it.

The chains 27 operate to yieldingly support the pans as before described and also to allow the pans to shift toward the sides of the machine should said sides come into contact with a plant or with any unyielding surfaces in the path of the side portion thereof. The springs 18 maintain the pans normally in proper position, these springs yielding should the pans be shifted outwardly.

What is claimed is:—

A machine of the class described, including a revoluble wheel supported axle, a frame tiltably mounted at its center upon the axle, a foraminous housing arched over the frame and extending downwardly from the sides thereof, said housing being open at the bottom and front end, the upper portion of the rear end of the housing being closed by an integral foraminous wall, a foraminous apron depending from said end wall and adapted to close the lower portion of the rear end of the housing, oppositely disposed pans extending longitudinally of the lower portion of the housing, connections between the sides of the housing and the respective pans, means on said connections for thrusting the pans yieldingly toward each other, the inner sides of the pans being arranged along forwardly diverging lines at the front ends thereof, the inner side walls of said pans overhanging the bottoms of said pans, alining longitudinal shafts supported by the frame and within the housing, beaters mounted for rotation with the respective shafts, and coöperating means upon the axle and longitudinal shafts for driving the beaters at the same or different speeds.

In testimony that I claim the foregoing as my own, I have hereto affixed my signature in the presence of two witnesses.

JOHN ROBERT CHRISTOPHER.

Witnesses:
C. B. PEARY,
J. H. BROOKS.

Copies of this patent may be obtained for five cents each, by addressing the "Commissioner of Patents, Washington, D. C."